US008402320B2

(12) United States Patent
Watkins et al.

(10) Patent No.: US 8,402,320 B2
(45) Date of Patent: Mar. 19, 2013

(54) INPUT/OUTPUT DEVICE INCLUDING A MECHANISM FOR ERROR HANDLING IN MULTIPLE PROCESSOR AND MULTI-FUNCTION SYSTEMS

(75) Inventors: John E. Watkins, Sunnyvale, CA (US); Elisa Rodrigues, Union City, CA (US)

(73) Assignee: Oracle International Corporation, Redwood City, CA (US)

( * ) Notice: Subject to any disclaimer, the term of this patent is extended or adjusted under 35 U.S.C. 154(b) by 183 days.

(21) Appl. No.: 12/786,988

(22) Filed: May 25, 2010

(65) Prior Publication Data

US 2011/0296255 A1    Dec. 1, 2011

(51) Int. Cl.
*G06F 11/00* (2006.01)
(52) U.S. Cl. ............. 714/43; 714/5.1; 714/5.11; 710/1
(58) Field of Classification Search .............. 714/5.1, 714/5.11, 43, 49, 56; 710/1, 15, 62, 305
See application file for complete search history.

(56) References Cited

U.S. PATENT DOCUMENTS

| 6,449,709 | B1 * | 9/2002 | Gates ........................... 710/310 |
| 7,694,047 | B1 * | 4/2010 | Alston ........................... 710/62 |
| 7,702,827 | B2 | 4/2010 | Biran |
| 2007/0101016 | A1 * | 5/2007 | Boyd et al. ..................... 709/238 |
| 2008/0288664 | A1 * | 11/2008 | Pettey et al. ..................... 710/5 |
| 2010/0023800 | A1 * | 1/2010 | Harari et al. ..................... 714/2 |
| 2010/0180182 | A1 * | 7/2010 | Trantham ..................... 714/799 |
| 2011/0182216 | A1 * | 7/2011 | Ono et al. ..................... 370/282 |

OTHER PUBLICATIONS

U.S. Appl. No. 12/787,001 titled "Input/Output Device Including a Mechanism for Accelerated Error Handling in Multiple Processor and Multi-Function Systems" filed May 25, 2010.

* cited by examiner

*Primary Examiner* — Joseph D Manoskey
(74) *Attorney, Agent, or Firm* — Meyertons Hood Kivlin Kowert & Goetzel; Stephen J. Curran

(57) ABSTRACT

An I/O device includes a host interface that may be configured to receive and process a plurality of transaction packets sent by a number of processing units, with each processing unit corresponding to a respective root complex. The host interface includes an error handling unit having error logic implemented in hardware that may be configured to determine whether each transaction packet has an error and to store information corresponding to any detected errors within a storage. More particularly, the error handling unit may perform the error detection and capture of the error information as the transaction packets are received, or in real time, while the error handling unit may include firmware that may subsequently process the information corresponding to the detected errors.

17 Claims, 3 Drawing Sheets

INPUT/OUTPUT DEVICE INCLUDING A MECHANISM FOR ERROR HANDLING IN MULTIPLE PROCESSOR AND MULTI-FUNCTION SYSTEMS

BACKGROUND

1. Technical Field

This disclosure relates to shared computer system input/output (I/O) resources, and, more particularly, to error handling within the shared resources.

2. Description of the Related Art

There have been significant increases in the effective throughput of a variety of I/O devices used in computing systems. In the recent past, a number of new communication standards have been introduced. For example, 10 Gigabit Ethernet may allow up to ten gigabits of information to be conveyed and Peripheral Component Interconnect Express (PCIe™) Generation 1 may allow up to 2.5 Gbits per lane. In many computer systems, a single processor or processing module may not use that much I/O bandwidth. Accordingly, in an effort to increase hardware resource utilization, sharing of I/O hardware resources may be desirable.

One mechanism for sharing resources that use PCIe interfaces is to virtualize the resources across multiple processing elements. Thus, I/O virtualization standards have been introduced, such as for example, the single root and multi-root PCIe specifications. However, there are issues with sharing hardware resources. For example, it may be challenging to process transactions that may be issued to a shared I/O subsystem by multiple processors or processing units, each of which may be running multiple processes. More particularly, an I/O device that implements a PCIe interface uses the notion of a function. Functions may be used to access respective hardware resources. Accordingly, since there may be multiple processor hierarchies and processes and multiple corresponding functions, it may be difficult to implement error detection, logging and reporting for such a shared multi-root, multi-function device.

SUMMARY

Various embodiments of an I/O device including a mechanism for handling errors in a multi-root multi-function system are disclosed. In one embodiment, the I/O device includes a host interface that may be configured to receive and process a plurality of transaction packets sent by a number of processing units, with each processing unit corresponding to a respective root complex. The host interface includes an error handling unit that may be configured to determine whether each transaction packet has an error and to store information corresponding to any detected errors within a storage. More particularly, the error handling unit may perform the error detection and capture of the error information as the transaction packets are received, or in real time. The error handling unit may be further configured to subsequently process the information corresponding to the detected errors.

In one specific implementation, the error handling unit may include error logic that is implemented in hardware and which may be configured to detect errors and store the error information within the storage. In addition, the error handling unit may include an error processor that may be configured to execute instructions to subsequently process the information corresponding to the detected errors. The instructions may be stored within a second storage on the I/O device.

Figure 1:
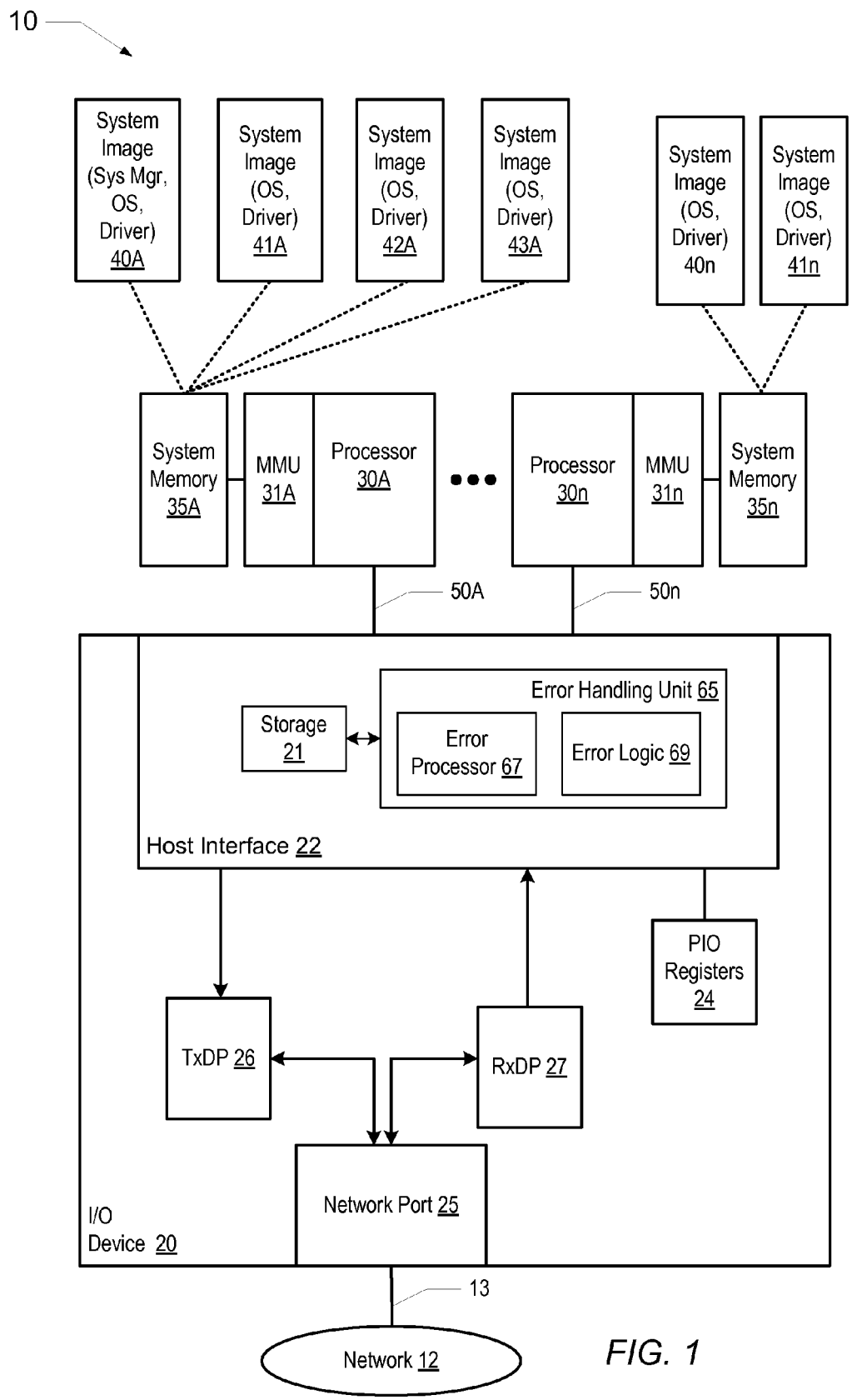
FIG. 1 is a block diagram of one embodiment of a computer system including a shared virtualized I/O device.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In a shared I/O device, there may be many error cases and processing of errors can be complex in multi-function multi-processor systems. To effectively implement an error processing subsystem in a shared I/O device, an effective partitioning of the architecture is such that hardware performs the basic error detection at packet rates (i.e., in real time), but when an error occurs, information is provided at some time later to an embedded processor system, which has the responsibility to process the errors (e.g., update one or more function's status and error logging registers, and issue one or more error messages in accordance with the particular protocol standards that are in use (e.g., PCIe). Accordingly, such an error handling subsystem or unit is described below in conjunction with the descriptions of FIG. 1 through FIG. 3.

Turning now to FIG. 1, a block diagram of one embodiment of a computer system 10 including an I/O device 20 connected to a network 12 is shown. Computer system 10 includes a plurality of processors designated 30A and 30n, where n may be representative of any whole number. As shown, the processors 30A and 30n are coupled to the I/O device 20 via respective communication links 50A and 50n. The I/O device 20 is coupled to a network 12. As shown, processor 30A is also coupled to a memory management unit, designated MMU 31A, which is in turn coupled to a system memory 35A. Similarly, processor 30n is coupled to MMU 31n and system memory 35n. It is noted that components having reference designators with a number and letter may be referenced by just the number where appropriate.

In one embodiment, each of the processors 30 may be representative of any type of processing unit including a single processor, a chip multiprocessor that includes multiple central processing units (CPUs) on a single substrate, or a processing node such as a blade processing unit or blade server, for example, which may include one or more CPUs in a single housing.

In the illustrated embodiment, the MMU 31 may be configured to control accesses to system memory 35A, as well as manage memory and policy for caching of a particular data type. Further, in one embodiment, MMU 31 may be configured to grant or deny accesses to certain addresses within a programmed I/O (PIO) configuration space by device drivers, dependent upon whether the requesting device driver has been allocated the requested address space.

System memory 35 may be representative of any type of memory medium. For example, in various embodiments, system memory 35 may be implemented using memory devices in the dynamic random access memory (DRAM) family of devices. However, system memory 35 may also be implemented using static RAM (SRAM) or other types of storage devices as desired. System memory 35 may be used to store program instructions, which may be fetched and executed by the processors 30A and 30n.

More particularly, as shown in FIG. 1, a number of system images designated 40A-43A may be stored within system memory 35A, as denoted by the dotted lines. Each of the system images may be representative of an instance of system software that is running on a given CPU within processor 30A. For example, the system image may include a system manager instance, an operating system instance, a device driver instance, as well as any other system level software executing on a processing unit. In addition, there may be several instances of a device driver executing on a given CPU. For example, as described in greater detail below, a CPU may be running several processes, each requiring I/O hardware resources within the I/O device 20. In one embodiment, each of those processes may have its own device driver instance that may be used to discover and access the respective hardware resources that have been assigned to each respective process.

In the illustrated embodiment, the I/O device 20 includes a network port 25 that is coupled to the network 12 via a network link.13. The I/O device 20 also includes a host interface 22 that is coupled to PIO registers 24.

In addition, as shown the I/O device 20 includes a transmit data path designated TxDP 26 and a receive datapath designated RxDP 27. In various embodiments, the RxDP 27 may include filtering and classification, and scheduling functionality, among others for transactions received from the network 12. The TxDP 26 circuits may include arbitration and scheduling functionality for transactions going out to the network 12. It is noted that I/O device 20 may also include a variety of other circuits that have been omitted here for simplicity. For example, in various embodiments, I/O device 20 may include, a bus interface for connection to a service processor (not shown).

The network port 25 may provide a connection to the network 12 using a network protocol. In various embodiments, the network 12 may use any of a variety of frame-based protocols such as the Ethernet protocol. As such, in one embodiment the network connection may be a 10-Gigabit Ethernet (10GE) connection. Accordingly, network port 25 may be configured to provide a cable or optical interface, as well as other network functions such as medium access control (MAC) functions, physical (PHY) layer functions, and physical coding sublayer (PCS) functionality (all not shown). It is noted that in other embodiments, other network protocols may be supported.

In one embodiment, the host interface 22 may include a plurality of I/O interfaces (not shown) that may be representative of Peripheral Component Interconnect (PCI) Express (PCIe™) compliant physical layer interfaces, each representing a PCIe endpoint. Accordingly, each of the links (e.g., 50A and 50n) may be PCIe links that include a number of lanes. In addition, each I/O interface may be independently configurable by the system manager instance running on a given processor, or a service processor if one is used. As such, in one embodiment, each of the processors 30 may also include a host bridge, root ports, root complex event collectors, and root complex endpoints (all not shown) and which may correspond to a PCIe root complex.

In one embodiment, I/O device 20 may be a virtualized device. As such, the host interface 22 may provide a shared set of resources (e.g., MAC, statistics and control, DMA channels, PIO configuration space) that allow each processor 30 to substantially transparently share the network port 25. The PIO registers unit 24 includes some number of configuration and status registers (e.g., 229 of FIG. 2), and supports memory mapped I/O posted and non-posted transactions. Each separate link 50 goes through an independent negotiation between each processor 30 and the host interface 22 to determine the link width, link speed, and the specific parameters pertaining to the lanes which comprise each link. In addition host interface 22 includes a storage 21. The storage 21 may be representative of any type of storage. For example, in various embodiments, storage 21 may be implemented using hardware registers, DRAM, SRAM, any of a variety of erasable programmable read only memory (EPROM) devices such as an electrically erasable programmable read only memory (EEPROM), or a combination.

Accordingly, in the virtualized environment, the I/O device 20 may provide a flexible number of I/O resources to a number of processes executing on the processing units 30. In one embodiment, the system manager or service processor may determine and allocate the hardware resources of the I/O device 20 among the processes during an initialization of computer system 10. The I/O device 20 may be configured to provide a measure of protection for the allocated resources such that no process may either accidentally or otherwise access the resources that have been allocated to another process.

More particularly, processors 30 may generate transaction requests to the I/O device 20 such as posted writes, non-posted reads, and configuration writes, and completions, for example. In addition, processors 30 may generate direct memory access (DMA) completion transactions for the I/O device 20. As described in greater detail below in conjunction with the descriptions of FIG. 2 and FIG. 3, in one embodiment, the host interface 22 may receive the packets, and while keeping the transactions from different processor hierarchies separated, the error handling unit 65 may perform error checking and error capturing of the packets when errors are detected, and error handling subsequent to the error capture. More particularly, as described above, the error handling functionality of error handling unit 65 may be partitioned between hardware (e.g., error logic 69) and firmware (i.e., instructions embedded within or stored locally to I/O device 20 and executed by the error processor 67). In one embodiment, the error logic 69 may be a hardware implementation that may detect errors and capture or store error information cumulatively into an error information storage for subsequent error processing. The error processor 67 may be an embedded processor that executes instructions that process the error information. In one embodiment, storage 21 may provide storage for the embedded instructions. The error processor 67 may provide updating of error status registers, error reporting and logging, and other error processing functionality. In one embodiment, the hardware of error logic 69 may detect errors and store the error information as the packets are received (i.e., at hardware speeds), while subsequent processing of the error information may be done as the error processor 67 is able to process the error information (i.e., at firmware speed).

It is noted that since storage 21 may be any type of storage, it is contemplated that storage 21 may be programmed during normal system operation, during an initialization routine, or during operation in a special programming mode. Alternatively, storage 21 may be a read-only type of storage that has been programmed or manufactured with a set of instructions and cannot be changed without replacing the storage 21.

In one embodiment, a processor hierarchy (i.e., root complex) represents an independent address space. More particularly, a processor hierarchy refers to the set of registers that are within the I/O address space or address spaces which belong to that processor. In a single processor system, there is generally one hierarchy and all I/O devices and the registers within those devices are within that hierarchy. In a multiple processor system such as computer system 10, for example, there may be multiple hierarchies where each processor is able to access only the devices or set of device registers which have been placed within the address space(s) of that processor. Accordingly, the host interface 22 may logically provide separate resources for each processor and isolate each resource set so only the processor whose address space contains them can gain access. The partitioning of I/O device resources into hierarchies is generally done prior to system software performing an I/O device enumeration such that when it occurs, each processor builds its respective I/O device tree that is representative of how the device is to be partitioned amongst multiple processors.

Figure 2:
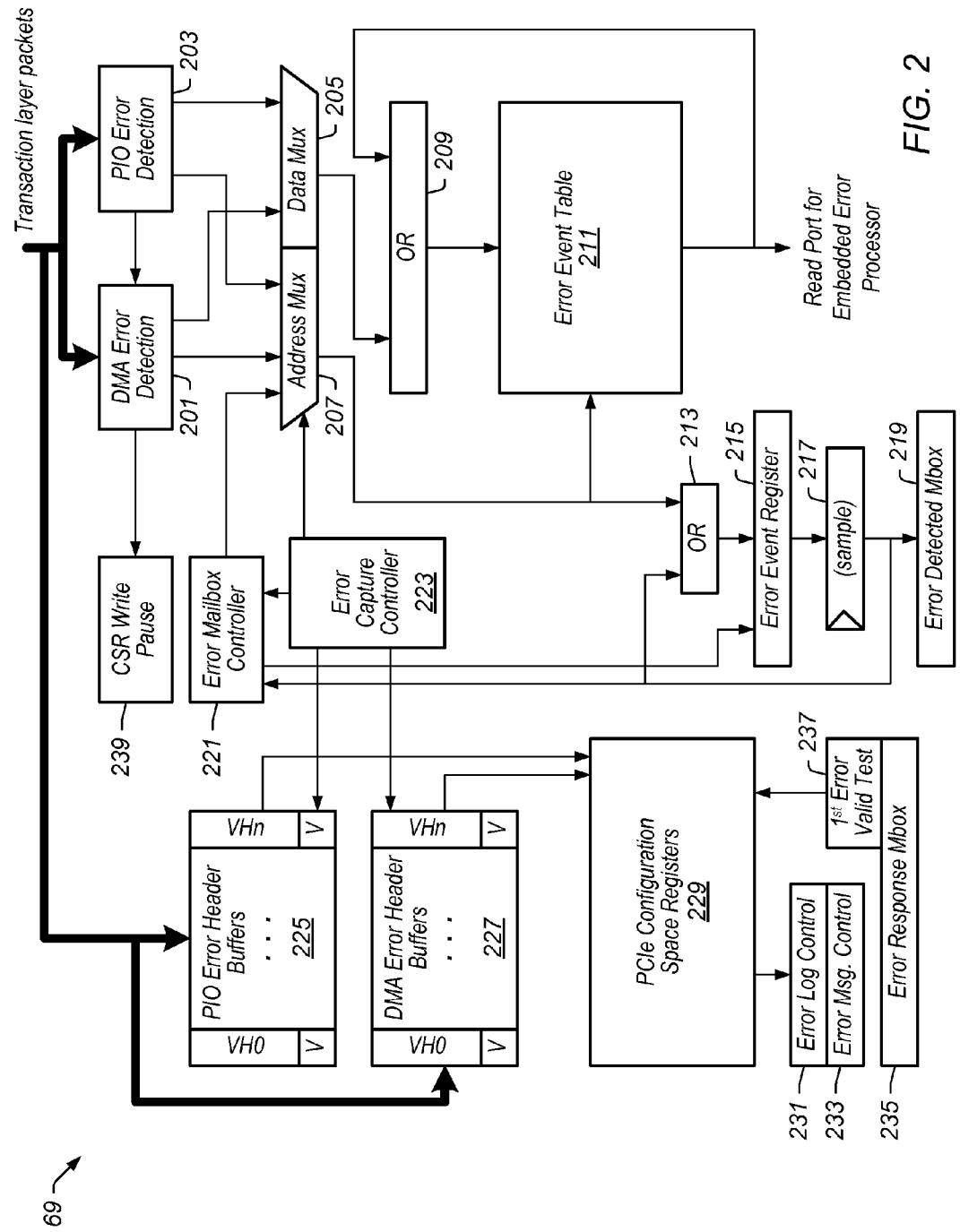
FIG. 2 is a block diagram illustrating more detailed aspects of an embodiment of the error handling unit shown in FIG. 1.

Referring to FIG. 2, a block diagram of one embodiment of the error logic of FIG. 1 is shown. The error logic 69 includes a DMA error detection unit 201 and a PIO error detection unit 203, both of which are coupled to receive transaction packets in, for example, a stream from the processors 30 of FIG. 1. The DMA and PIO error detection units 201 and 203, respectively, are coupled to the address multiplexer (mux) 207 and the data mux 205. The data mux 205 is coupled to the OR-ing function 209 which is in turn coupled to the error event table 211. The error event table output may be read through a read port which is also coupled back to the OR-ing function 209. The address mux 207 is coupled to the input of another OR-ing function 213, which is coupled to an error event register 215. The error event register is coupled to a sampling register 217, which is coupled to a PCIe error detected mailbox 219. The output of the sampling register 217 is also coupled to an error mailbox controller 221, and to the input of OR-ing function 213. The error capture controller 223 is coupled to the error mailbox controller 221 and to the mux select of mux 207, 205. In addition, the error capture controller 223 is also coupled to the PIO error header buffers 225 and the DMA error header buffers 227. The PIO error header buffers 225 and the DMA error header buffers 227 are coupled to the PCIe configuration space registers 229, which are coupled to the error log control 231, the error message control 233, and the PCIe error response mailbox 235 via a first error valid test unit 237. It is noted that as described above, the PCIe configuration space registers 229 may be part of the PIO registers unit 24 of FIG. 1, and are shown here for simplicity. It is also noted that in the illustrated embodiment the packets are labeled as transaction layer packets. However, in other embodiments, the error handling unit may be implemented in other layers such as the data link layer or the physical layer, for example. In such embodiments, the packets may be received and error processed at those layers.

The DMA error detection unit 201 and the PIO error detection unit 203 may be configured to detect errors in the received packets as they are received. More particularly, in one embodiment, each of units 201 and 203 may detect errors ranging from packet header errors, end-to-end cyclic redundancy code (CRC) errors to malformed packet errors, among others. In one embodiment, there may be a listing of errors for which packets may be checked depending on the particular protocol used. For example, if a PCIe link and protocol is used, the PCIe Specification may identify the different types of errors that must be detected, and what procedures must be followed when a given error is detected. The detection units may also attempt to bind the packet by association to a specific function or determine whether the error is not localized and is non-function specific.

If an error is detected, the error event is captured and stored in the error event table 211 in real time. In one embodiment, the error event table 211 may include a number of entries corresponding to individual functions and processor hierarchies. More particularly, in one implementation, there may be an entry that corresponds to each function in the I/O device 20. In addition, there may be one or more entries corresponding to each processor hierarchy. Accordingly, when an error is detected, if the specific function with which the packet is associated can be determined, then the error information for that packet may be stored in an entry that corresponds to that specific function. However, if a specific function cannot be determined, then the error information may be stored in an entry that corresponds to the processor hierarchy with which the packet is associated. In one embodiment, each entry may include several information fields that identify the error status type. As such, the error detection units 201 and 203 may encode the information and store it within the error event table 211.

In one embodiment, the error event table 211 may be implemented as a memory storage such as a form of random access memory. Alternatively, the table 211 may be implemented using hardware registers, or register files or the like. Regardless of the implementation, the error processor 67 may have independent access to the contents of each entry in the error event table 211 using a read port or by any of a variety of mechanisms, as desired. As shown in FIG. 2, as the error information is stored to the error event table, the new information is OR-ed with the existing information for a given respective entry using OR-ing function 209 so that the error information may be accumulated (i.e., as new information is added, the older error information is not written over, but added to).

In one embodiment, the error event register 215 includes a bit for each entry in the error event table 211. Accordingly, when an entry in the error event table 211 is updated with an error, the corresponding bit in the error event register is caused to indicate the error status. The OR-ing function 213 allows multiple error events corresponding to multiple items in the error event table to be flagged. In one implementation, a bit in the error event register 215 may be set (e.g., to a logic value of one) to indicate an error has been logged in the corresponding entry of the error event table 211. However, it is contemplated that in other implementations a bit in the error event register 215 may be cleared (e.g., to a logic value of zero) to indicate an error has been logged in the corresponding entry of the error event table 211.

As shown, the sample register 217 may copy the contents (i.e., take a snapshot) of the error event register 215 and load them into the error detected mailbox 219. As described below, the sample register 217 may sample the contents of the error event register 215 when the sample register 217 detects that the error detected mailbox 219 has been emptied. In one embodiment, storing the snapshot into the error detected mailbox 219 causes an interrupt to the error processor 67 to be generated. In response to the interrupt, the error handling routine may read or cause to be read, each entry in the error event table 211 in which an error was indicated by the mailbox snapshot. When the error processor 67 has finished processing the errors indicated in the snapshot (or at some point during error processing), the error processor 67 will clear the error detected mailbox 219. In response to reading a given entry in then error event table 211 the errors in that entry are cleared. In addition, the error indication in the error event register 215 that corresponds to the entry in the error event table 215 may also be cleared by the error mailbox controller 221.

In addition to capturing the error type in the error event table 211, the header of the packet with the error is also captured when possible. Accordingly, the error header buffers 225 and 227 may be used to temporarily store the PIO and DMA packet headers, respectively. Thus, as errors are detected, the error detection units 201 and 203 may notify the error capture controller 223, which may cause the packet header to be stored within the corresponding error header buffer. In the illustrated embodiment, the error header buffers 225 and 227 may be large enough to store one packet header per processor hierarchy (VH). Accordingly, as shown the buffers are labeled VH0 through VHn, where n may be any positive integer. However, it is noted that in other embodiments it is contemplated that larger numbers of headers may be captured, thus headers may be captured for specific functions. In one embodiment, each function specific entry in the error event table 211 may include an encoded field that identifies the error in that entry for which an error header has been captured in the header buffer. If that field is all zero, it indicates that no error has a corresponding header in the error header buffers. This situation may occur when multiple errors occur, the packet header has not yet been transferred to the configuration space when then next error is captured and a free error header buffer is not available. As described further below, the packet headers will eventually be transferred to the configuration space advanced error header log section (not shown) when there is space available.

In one embodiment, since not every error will have a header associated with it, the CSR registers include a first error pointer (not shown) which may be an encoded field that points to the uncorrectable error for a given function that has a header log associated with it.

When the host processor is finished processing an error and/or using the header information, the host processor may write to the bit in the corresponding uncorrectable error status register within the configuration space registers. In response to this bit being written to by the host (in one embodiment a logic value of one is written to clear the error), the error header log may be cleared for that error, which will allow the next header to be transferred from the error header buffer 225 or 227.

In the illustrated embodiment, error log control 231 may include a number of bits that control how much and what error information is logged on a per function basis. The error msg control 233 provides hierarchy and data integrity information used by the error processor 67 when it conditionally formulates the error message packet to be sent to a host notifying it that an error was detected so that, for example, the error message packets may be directed to the appropriate processor hierarchy.

In one embodiment, in response to an attempt by the error processor 67 to update the error status register and the error header log in the CSR 229 with the header log from the error header buffers 225 and 227, the first error valid test unit 237 may check to see if the error header log has been cleared. If the error header log has not been cleared the first error valid test unit 237 may invalidate the attempt. However, even if the update is unsuccessful, the attempt will clear the corresponding entry in the error header buffers 225 and 227.

In one embodiment, the CSR write pause unit 239 may be configured to inhibit any host updates (e.g., a CSR write request) to the CSR space by pausing the host processor request until the error that is currently being processed has completed. In this way, the host processor may not change the way the error processing that is in-progress is done which may occur if the host changes control information that is reflected in error log control 231 and/or error msg control 233. Once the error processing is done, the CSR write request is allowed to go through.

Figure 3:
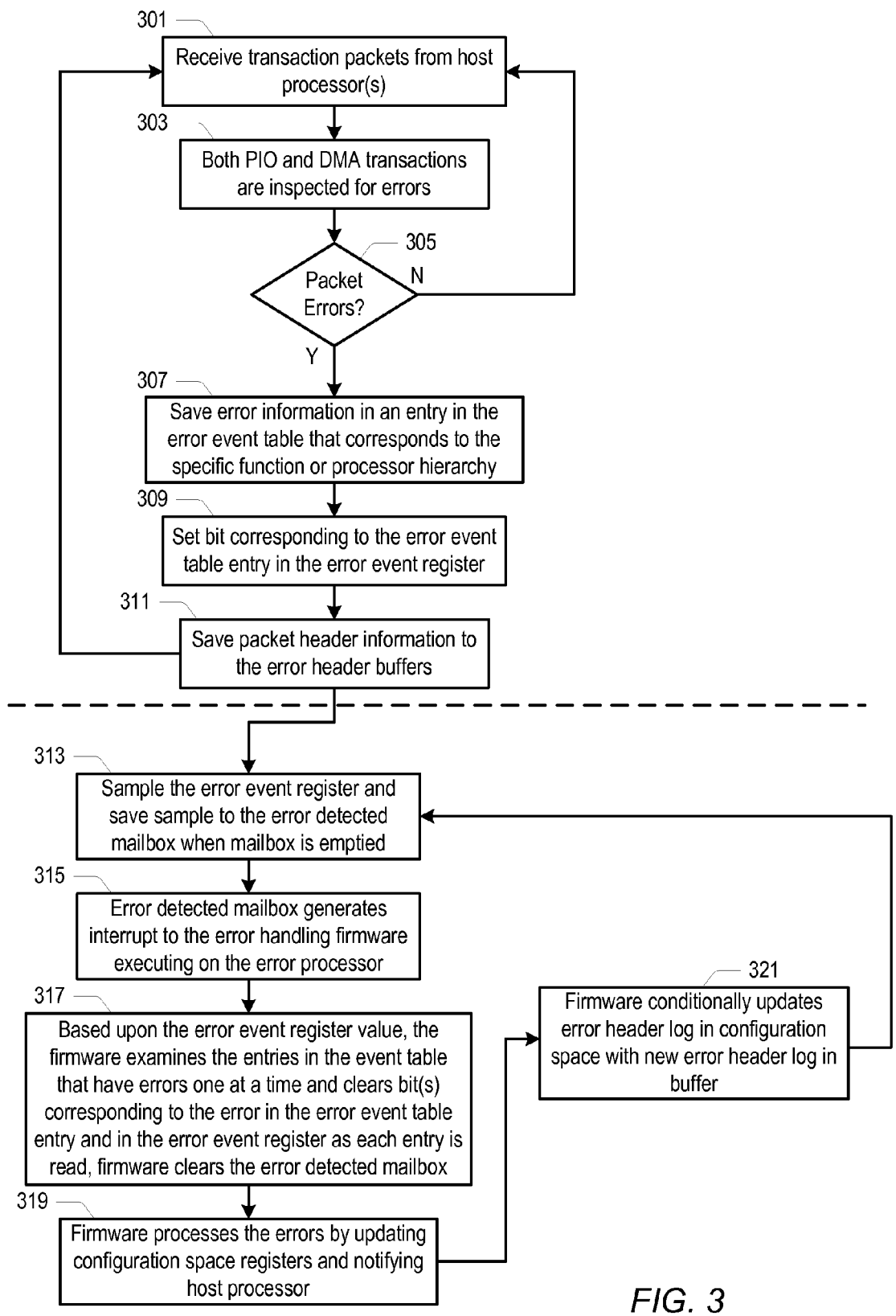
FIG. 3 is a flow diagram describing operational aspects of an embodiment of the error handling unit of the I/O device shown in FIG. 1 and FIG. 2.

In FIG. 3, a flow diagram depicting operational aspects of the embodiments shown in FIG. 1 and FIG. 2 is shown. As shown in FIG. 3, the error capture functionality and the error processing functionality are separated by the dashed line. As described above, the error capture functionality may be implemented primarily in hardware, and the capture of the errors may occur in real time, as the packets are received. On the other hand, the error processing functionality may be implemented as firmware. Furthermore, the error processing may be performed concurrently with the error capture, but at the rate at which the firmware can process the errors, and typically slower than the error capture rate.

Referring collectively to FIG. 1 through FIG. 3, and beginning in block 301 of FIG. 3, as transaction packets are received from host processors (e.g., processors 30), depending on whether the transactions are DMA or PIO transactions, either the DMA error detection unit 201 or the PIO error detection unit 203 will inspect the packets for errors (block 303). If there are no errors detected, operation continues as described above in conjunction with the description of block 301.

However, if errors are detected in a packet (block 305), error information may be stored in an entry in the error event table 211 (block 307). More particularly, if the error detection unit (e.g., 201, 203) can determine to which specific function the packet corresponds, then it will save the error information in an entry of the error event table 211 that corresponds to that function. However, if the error detection unit cannot determine the function such as may occur when a malformed packet, for example, is received, the error detection unit may save the error information in an entry of the error event table that corresponds to the processor hierarchy from which the packet originated. In addition, the error detection unit 201, 203 may also cause a bit corresponding to the error event table entry to be set in the error event register 215 (block 309). Further, the error capture controller 223 may cause the packet header of the packet with the error to be stored within the appropriate error header buffer (e.g., 225 or 227) (block 311). Operation continues in an iterative fashion such that errors may continue to be captured as the packets are received, as described above in conjunction with the description of block 301.

As error indications are accumulated in the error event register 215 during error capture operation, the sample register may sample (i.e., load the contents of) the error event register 215 (block 313). As described above in one embodiment, each time the error detected mailbox 219 is emptied, the sample register 217 may perform the sample. The sample register 217 may then copy the contents to the error detected mailbox 219. In response to the contents of the sample register being loaded into the error detected mailbox 219, an interrupt is generated and provided to the error processor 67 to notify the error handling instructions that there are new errors to process (block 315).

The error processing firmware examines the contents of the error detected mailbox 219 to determine which entries in the error event table 211 have errors. In one embodiment, the firmware then successively accesses each entry of the error event table 211 and reads the error information in that entry. As each entry is read, the error information in that entry may be cleared, the bit corresponding to that entry in the error event register 215 may be cleared, and the corresponding bit in the error detected mailbox 219 may be cleared (block 317).

As described above, the firmware processes each error by, for example, updating the configuration space registers 229 with the error status, causing the packet header log to be transferred to the error header log in the configuration space registers 229, etc. The firmware may then notify the host processor 30 that initiated the transaction packet with the error (block 319).

In one embodiment, the firmware may attempt to update the error header log in the configuration space. If the host processor 30 has cleared the error header log, the update may occur (block 321). However, as described above, if the host processor 30 has not cleared error header log in the configuration space, the update may not occur. In either case the firmware will clear the entry in the error header buffer for the next error.

It is noted that although the operations are shown and described in a particular order in the embodiment shown in FIG. 3, it is contemplated that in other embodiments various ones of the operations may be performed in a different order.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An input/output (I/O) device comprising:
a host interface configured to receive and process a plurality of transaction packets sent by a plurality of processing units, each processing unit corresponding to a respective root complex; and
a plurality of groups of configuration space registers, each group corresponding to one of a plurality of functions;
wherein the host interface includes an error handling unit configured to, as the transaction packets are received, determine whether each transaction packet has an error and to store information corresponding to any detected errors within a storage; and
wherein the error handling unit is further configured to:
subsequently process the information corresponding to the detected errors;
update one or more of the configuration space registers; and
determine whether a given transaction packet having an error is associated with a particular function associated with a process executing on a processing unit of a given root complex or whether the given transaction packet having the error is associated with a particular root complex and the error is not resolvable to a single function.

2. The device as recited in claim 1, wherein the error handling unit includes error logic implemented in hardware that is configured to detect the errors and to store the information corresponding to the detected errors.

3. The device as recited in claim 2, wherein the error handling unit further includes an error processor configured to execute error processing instructions for subsequent processing of the information corresponding to the detected errors, wherein the instructions are stored within a second storage within the I/O device.

4. The device as recited in claim 3, wherein the error logic is further configured to notify the error processor of the occurrence of the storage of the error information within the storage, and to which entries of a plurality of entries within the storage the error information was stored.

5. The device as recited in claim 4, wherein in response to the notification by the error logic, the error processor is configured to successively access each entry of the table identified in the notification as having error information.

6. The device as recited in claim 5, wherein the error processor is further configured to clear the error information within each entry that is accessed.

7. A method comprising:
receiving and processing a plurality of transaction packets sent by a plurality of processing units, each processing unit corresponding to a respective root complex;
as the transaction packets are received, an error handling unit determining whether each transaction packet has an error and storing, within a storage, information corresponding to any detected errors; and
subsequently processing the information corresponding to the detected errors;
wherein the processing the information includes:
an error processor updating one or more configuration space registers of a plurality of groups of configuration space registers, wherein each group of configuration space registers corresponds to one of a plurality of functions; and
error logic determining whether a given transaction packet having an error is associated with a particular function associated with a process executing on a processing unit of a given root complex or whether the given transaction packet having the error is associated with a particular root complex and the error is not resolvable to a single function.

8. The method as recited in claim 7, wherein the error handling unit includes error logic implemented in hardware detecting the errors and to store the information corresponding to the detected errors.

9. The method as recited in claim 8, wherein the error handling unit further includes an error processor executing error processing instructions for subsequent processing of the information corresponding to the detected errors, wherein the instructions are stored within a second storage within the I/O device.

10. The method as recited in claim 9, further comprising the error logic notifying the error processor of the occurrence of the storage of the error information within the storage, and to which entries of a plurality of entries within the storage the error information was stored.

11. The method as recited in claim 10, wherein in response to the notification by the error logic, the error processor successively accessing each entry of the table identified in the notification as having error information and clearing the error information within each entry that is accessed.

12. A system comprising:
one or more processing units each configured to execute operating system software and one or more application device drivers; and
an input/output (I/O) device coupled to each of the one or more processing units via a respective communication link;
wherein the I/O device includes:
a host interface configured to receive and process a plurality of transaction packets sent by a plurality of processing units, each processing unit corresponding to a respective root complex;
wherein the host interface includes an error handling unit configured to, as the transaction packets are received, determine whether each transaction packet has an error and to store information corresponding to any detected errors within a storage;
wherein the error handling unit is further configured to subsequently process the information corresponding to the detected errors;
wherein the error handling unit includes error logic implemented in hardware and configured to detect the errors and to store the information corresponding to the detected errors; and
wherein the error logic is further configured to determine with which particular function associated with a process executing on a processing unit of a given root complex a received transaction packet is associated.

13. The system as recited in claim 12, wherein the error handling unit includes an error processor configured to execute error processing instructions for subsequent processing of the information corresponding to the detected errors, wherein the instructions are stored within a second storage within the I/O device.

14. The system as recited in claim 13, wherein the error logic is further configured to notify the error processor of which entries of a plurality of entries within the storage the error information was stored.

15. The system as recited in claim 14, wherein in response to the notification by the error logic, the error processor is configured to successively access each entry of the table identified in the notification as having error information.

16. The system as recited in claim 15, wherein the error processor is further configured to clear the error information within each entry that is accessed.

17. The system as recited in claim 12, wherein the error logic is further configured to determine which respective root complex is associated with a received transaction packet that has an error that is not resolvable to a single function.

* * * * *

UNITED STATES PATENT AND TRADEMARK OFFICE
CERTIFICATE OF CORRECTION

PATENT NO. : 8,402,320 B2
APPLICATION NO. : 12/786988
DATED : March 19, 2013
INVENTOR(S) : Watkins et al.

It is certified that error appears in the above-identified patent and that said Letters Patent is hereby corrected as shown below:

In the Specifications

In column 3, line 46, delete "link.13." and insert -- link 13. --, therefor.

Signed and Sealed this
Ninth Day of July, 2013

Teresa Stanek Rea
*Acting Director of the United States Patent and Trademark Office*